(12) United States Patent
Fukaya et al.

(10) Patent No.: US 8,409,682 B2
(45) Date of Patent: Apr. 2, 2013

(54) HEAT-RESISTANT AIR HOSE FOR DIESEL ENGINE

(75) Inventors: Hideji Fukaya, Kasugai (JP); Masashi Noda, Konan (JP)

(73) Assignee: Tokai Rubber Industries, Ltd., Komaki-shi, Aichi (JP)

( * ) Notice: Subject to any disclaimer, the term of this patent is extended or adjusted under 35 U.S.C. 154(b) by 142 days.

(21) Appl. No.: 11/700,249

(22) Filed: Jan. 31, 2007

(65) Prior Publication Data

US 2007/0190278 A1    Aug. 16, 2007

(30) Foreign Application Priority Data

Feb. 1, 2006 (JP) .................... 2006-024565
Jan. 25, 2007 (JP) .................... 2007-015248

(51) Int. Cl.
| | |
|---|---|
| *B32B 1/08* | (2006.01) |
| *B32B 25/04* | (2006.01) |
| *B32B 27/30* | (2006.01) |
| *F16L 11/20* | (2006.01) |
| *F16L 11/04* | (2006.01) |

(52) U.S. Cl. .............. 428/36.91; 428/35.7; 428/36.8; 428/36.9; 138/137

(58) Field of Classification Search .......... 428/35.7, 428/36.8, 36.9, 36.91, 422; 138/127, 137
See application file for complete search history.

(56) References Cited

U.S. PATENT DOCUMENTS

| | | | |
|---|---|---|---|
| 4,257,699 A * | 3/1981 | Lentz ............ | 430/124.33 |
| 4,759,388 A | 7/1988 | Kiyama et al. | |
| 4,942,906 A | 7/1990 | Igarashi et al. | |
| 5,094,781 A * | 3/1992 | Miyata et al. ......... | 252/609 |
| 5,401,442 A * | 3/1995 | Miyata .................. | 252/609 |
| 5,506,322 A | 4/1996 | Ichikawa et al. | |
| 5,585,424 A * | 12/1996 | Ohata et al. .......... | 524/264 |

(Continued)

FOREIGN PATENT DOCUMENTS

| | | |
|---|---|---|
| DE | 42 38 606 C1 | 6/1994 |
| EP | 0 947 757 A | 10/1999 |

(Continued)

OTHER PUBLICATIONS

Wu, Y.-T. and McBride, E. 2003. Ethylene-Acrylic Elastomers. Kirk-Othmer Encyclopedia of Chemical Technology. Published online Nov. 14, 2003.*

(Continued)

*Primary Examiner* — Erik Kashnikow
(74) *Attorney, Agent, or Firm* — Westerman, Hattori, Daniels & Adrian, LLP

(57) ABSTRACT

A heat-resistant air hose for a diesel engine comprising a tubular inner layer and an outer layer formed on an outer peripheral surface of the inner layer, wherein a material for forming the inner layer contains at least one of the following components (A) and (B) and excludes an acid receiver, and a material for forming the outer layer contains a non-peroxide-crosslinkable ethylene acrylic rubber and a non-halogen flame retardant wherein the non-halogen flame retardant is present at not less than 60 and less than 80 parts by weight based on 100 parts by weight of the non-peroxide-crosslinkable ethylene acrylic rubber:

(A) an alloy material formed by mixing ethylene acrylic rubber and fluororubber wherein the ethylene acrylic rubber is present at not less than 20% by weight based on the total alloy material; and (B) at least one of acrylic rubber and ethylene acrylic rubber.

5 Claims, 1 Drawing Sheet

U.S. PATENT DOCUMENTS

| | | | |
|---|---|---|---|
| 6,035,899 A | | 3/2000 | Ohkoshi et al. |
| 6,130,282 A | * | 10/2000 | Imahashi et al. ............... 524/436 |
| 6,161,592 A | | 12/2000 | Yamamoto et al. |
| 2004/0226624 A1 | * | 11/2004 | Mori ............................. 138/126 |
| 2004/0249051 A1 | | 12/2004 | Noda et al. |
| 2004/0266922 A1 | * | 12/2004 | Kanba et al. .................. 524/237 |
| 2006/0019048 A1 | | 1/2006 | Nakano et al. |

FOREIGN PATENT DOCUMENTS

| | | |
|---|---|---|
| EP | 1 334 995 A1 | 8/2003 |
| EP | 1 348 538 A1 | 10/2003 |
| EP | 1 378 539 A1 | 1/2004 |
| EP | 1 445 280 A1 | 8/2004 |
| EP | 1 559 538 A1 | 8/2005 |
| EP | 1 568 484 A1 | 8/2005 |
| JP | 6-107879 A | 4/1994 |
| JP | 7-229584 A | 8/1995 |
| JP | 11-151768 A | 6/1999 |
| JP | 2000-327857 A | 11/2000 |
| JP | 2001-012660 A | 1/2001 |
| JP | 2002-037935 A | 2/2002 |
| JP | 2003-82029 A | 3/2003 |
| JP | 2003-231790 A | 8/2003 |
| JP | 2005-214294 A | 8/2005 |

OTHER PUBLICATIONS

European Search Report dated Sep. 20, 2007 for corresponding European Patent Application No. 07002122.5.

Database WPI Week 200520, Derwent Publications Ltd., London, GB; AN 2005-185837 (XP002449060) & JP 2005 029604 A, Feb. 3, 2005 abstract.

Database WPI Week 200506, Derwent Publications Ltd., London, GB; AN 2005-050959 (XP002449061) & JP 2004 352763 A, Dec. 16, 2004 abstract.

Database WPI Week 200348, Derwent Publications Ltd., London, GB; AN 2003-508354 (XP002449062) & JP 2003 004178 A, Jan. 8, 2005 abstract.

Japanese Office Action dated May 31, 2011, issued in corresponding Japanese Patent Application No. 2007-015248.

Japanese Office Action dated Oct. 11, 2011, issued in corresponding Japanese Patent Application No. 2007-015248.

Decision to Grant a Patent dated Feb. 14, 2012, issued in corresponding Japanese Patent Application No. 2007-015248.

* cited by examiner

HEAT-RESISTANT AIR HOSE FOR DIESEL ENGINE

BACKGROUND OF THE INVENTION

1. Field of the Invention

The present invention relates to a heat-resistant air hose for a diesel engine for use as a diesel particulate filter (DPF) sensor hose; and a vacuum brake hose, an air hose, a turbo (supercharger) air hose and the like for a diesel engine.

2. Description of the Art

From the viewpoint of worldwide increasing environmental consciousness, DPF system and turbo system for decreasing PM (Particulate Matter) and NOx in the exhaust gas have been steadily adopted. As a fuel hose and an air hose, conventionally used, for example, a hose such that an inner layer in contact with fuel is formed by fluororubber or acrylic rubber is proposed (see, for example, Japanese unexamined Patent Publication Nos. H07-229584 and 2003-82029).

At the same time, control of exhaust emissions from diesel-powered vehicles has been recently tightened. New engine system (common-rail injection system) corresponding to such tightened control, and DPF system and turbo system for decreasing PM and NOx in the exhaust gas have been steadily adopted. Under such circumstances, there have been increasing demands on requirements for the heat-resistant air hoses for a diesel engine, such as a DPF sensor hose. In other words, the temperatures of the DPF system and the turbo system are elevated in order that combustion efficiency is improved to decrease exhaust gas such as PM and NOx. Thus, higher heat resistance is required for the heat-resistant air hose for a diesel engine as compared with a conventional hose. However, a conventional hose using fluororubber (FKM) for an inner layer includes an acid receiver, exhaust-gas resistance (acid resistance) is inferior, while a conventional hose using an epichlorohydrin-ethylene oxide copolymer (ECO) for an outer layer has insufficient heat-resistance.

In view of the foregoing, it is an object of the present invention to provide a heat-resistant air hose for a diesel engine excellent in exhaust-gas resistance (acid resistance), heat resistance and flame retardance.

SUMMARY OF THE INVENTION

In accordance with the present invention to achieve the object described above, there is provided a heat-resistant air hose for a diesel engine comprising a tubular inner layer and an outer layer formed on an outer peripheral surface of the inner layer, wherein a material for forming the inner layer contains at least one of the following components (A) and (B) as an essential component and excludes an acid receiver, and a material for forming the outer layer contains a non-peroxide-crosslinkable ethylene acrylic rubber and a non-halogen flame retardant as essential components wherein the non-halogen flame retardant is present at not less than 60 and less than 80 parts by weight based on 100 parts by weight of the non-peroxide-crosslinkable ethylene acrylic rubber:

(A) an alloy material formed by mixing ethylene acrylic rubber and fluororubber wherein the ethylene acrylic rubber is present at not less than 20% by weight based on the total alloy material; and (B) at least one of acrylic rubber and ethylene acrylic rubber.

The inventors of the present invention have conducted intensive studies by focusing on the materials for forming each layer for obtaining a heat-resistant air hose for a diesel engine excellent in exhaust-gas resistance (acid resistance), heat resistance and flame retardance. As a result, the inventors have found that when the inner layer is formed by an alloy material, obtained by selecting fluororubber and ethylene acrylic rubber as a material for forming an inner layer in terms of good heat resistance and good exhaust-gas resistance and arranging a percentage of the ethylene acrylic rubber therein within a specified range, or formed by at least one of acrylic rubber and ethylene acrylic rubber, while the outer layer is formed by a material wherein an amount of the non-halogen flame retardant is arranged within a specified range based on the non-peroxide-crosslinkable ethylene acrylic rubber, so that the above-mentioned object can be achieved. Thus, the inventors attained the present invention. This is because of the following reason. Since compatibility between at least one of acrylic rubber and ethylene acrylic rubber of the inner layer and ethylene acrylic rubber of the outer layer is good, interlaminar adhesion is improved. Further, since the inner layer material excludes an acid receiver, such as metal hydroxide, there is no problem that an acid receiver is dissolved by an exhaust gas (concentrated acid fluid) so as to cause crack. Still further, since ethylene acrylic rubber, superior to ECO in terms of heat resistance, is selected for a material for forming an outer layer, and also the outer layer material is treated by the addition of non-halogen flame retardant so as to have flame retardance, higher heat resistance can be realized as compared with ECO. Even still further, since there is not necessary to add peroxide crosslinking agent by selecting non-peroxide-crosslinkable ethylene acrylic rubber, there is no problem that physical properties at ordinary state or the like are deteriorated by crosslinking inhibition caused by non-halogen flame retardant, such as metal hydroxide, in the case where peroxide crosslinking agent is used.

In the heat-resistant air hose for a diesel engine of the present invention, the inner layer is formed by an alloy material, obtained by selecting fluororubber and ethylene acrylic rubber as a material for forming an inner layer in terms of good heat resistance and good exhaust-gas resistance and arranging a percentage of the ethylene acrylic rubber therein within a specified range, or formed by at least one of acrylic rubber and ethylene acrylic rubber, while the outer layer is formed by a material wherein an amount of the non-halogen flame retardant is arranged within a specified range based on the non-peroxide-crosslinkable ethylene acrylic rubber. Thus, according to the present invention, since compatibility between at least one of acrylic rubber and ethylene acrylic rubber of the inner layer and ethylene acrylic rubber of the outer layer is good, interlaminar adhesion is improved. Further, since the inner layer material excludes an acid receiver, such as metal hydroxide, there is no problem that an acid receiver is dissolved by an exhaust gas (concentrated acid fluid) so as to cause crack. Still further, since ethylene acrylic rubber, superior to ECO in terms of heat resistance, is selected for a material for forming an outer layer, and also the outer layer material is treated by the addition of non-halogen flame retardant so as to have flame retardance, higher heat resistance can be realized as compared with ECO. Even still further, since there is not necessary to add peroxide crosslinking agent by selecting non-peroxide-crosslinkable ethylene acrylic rubber, there is no problem that physical properties at ordinary state or the like are deteriorated by crosslinking inhibition caused by non-halogen flame retardant, such as metal hydroxide, in the case where peroxide crosslinking agent is used. Also, since a relatively large amount of inexpensive non-halogen flame retardant is mixed therein, the low cost can be realized.

When the non-halogen flame retardant for forming the outer layer is at least one of metal hydroxide and surface-treated metal hydroxide, flame retardance is improved.

DESCRIPTION OF THE PREFERRED EMBODIMENTS

Embodiments of the present invention will hereinafter be described in detail.

Figure 1:
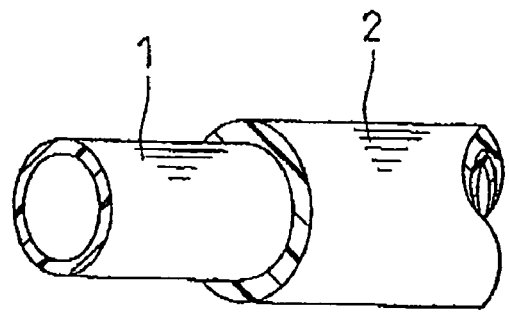
FIG. 1 is a schematic diagram illustrating the construction of an embodiment of a heat-resistant air hose for a diesel engine according to the present invention.

A heat-resistant air hose for a diesel engine according to the present invention has a structure, for example, as shown in FIG. 1, of a tubular inner layer 1 and an outer layer 2 formed on an outer peripheral surface of the tubular inner layer.

According to the present invention, the inner layer 1 is formed by using a material containing at least one of a component (A) (a specific alloy material) and a component (B) (at least one of acrylic rubber and ethylene acrylic rubber) as an essential component and excluding an acid receiver, and the outer layer 2 is formed by using a material containing non-halogen flame retardant at a specified range based on non-peroxide-crosslinkable ethylene acrylic rubber, which are the most characteristic features.

The specific alloy material (component A)) is prepared by mixing ethylene acrylic rubber (AEM) and fluororubber (FKM) such that content of the ethylene acrylic rubber (AEM) is not less than 20% by weight based on the total alloy material. When the content of the ethylene acrylic rubber (AEM) based on the total alloy material is less than 20% by weight, the percentage of the fluororubber (FKM) is too large, and thus adhesion with the outer layer 2 is deteriorated, which may cause delamination.

As the fluororubber (FKM), those which are crosslinkable with peroxide are preferred. Examples thereof include vinylidene fluoride (VdF) based fluororubbers such as a VdF-hexafluoro propylene (HFP) type, a VdF-tetrafluoroethylene (TFE)-HFP type, a VdF-chlorotrifluoroethylene (CTFE) type; a TFE-propylene (Pr) type; a HFP-ethylene type; a VdF-perfluoro (alkyl vinyl ether) (PAVE) type; a TFE-PAVE type; a fluoro silicone rubber; a fluorophosphazen rubber; and a thermoplastic elastomer containing fluororubber.

As the ethylene acrylic rubber (AEM), those which are crosslinkable with peroxide are preferred. Examples thereof include AEM obtained by introducing an ethylene monomer into a main component comprising one kind or two kinds of an acrylic monomer or a methacrylic monomer.

Examples of the acrylic monomer include methyl acrylate, ethyl acrylate, propyl acrylate, n-butyl acrylate, n-octyl acrylate, methoxy methyl acrylate, methoxy ethyl acrylate and ethoxy ethyl acrylate. Further, examples of the methacrylic monomer include methacrylates corresponding to the above acrylic monomers.

Further, a monomer other than the acrylic monomer (or the methacrylic monomer) and the ethylene monomer may be introduced into the ethylene acrylic rubber (AEM).

As a vulcanizing agent for the specific alloy material (component (A)), a peroxide crosslinking agent is used. The peroxide crosslinking agent is not specifically limited, however, examples thereof include 2,4-dichloro-benzoyl peroxide, benzoyl peroxide, 1,1-di-t-butylperoxy-3,3,5-trimethyl cyclohexane, 2,5-dimethyl-2,5-di-benzoylperoxyhexane, n-butyl-4,4'-di-t-butylperoxy valerate, dicumyl peroxide, t-butyl peroxybenzoate, di-t-butylperoxy-diisopropylbenzene, t-butyl cumylperoxide, 2,5-dimethyl-2,5-di(t-butylperoxy)hexane, di-t-butylperoxide, 2,5-dimethyl-2,5-di-t-butylperoxy hexane-3, which may be used either alone or in combination. Among them, di-t-butylperoxy-diisopropylbenzene is preferably used because of no odor in crosslinking.

The peroxide crosslinking agent is preferably present in a proportion of 1 to 5 parts by weight (hereinafter just abbreviated to "parts") based on 100 parts of the above-mentioned specific alloy material (component (A)). If the proportion of the peroxide crosslinking agent is smaller than 1 part, the resulting hose tends to have low strength because of insufficient crosslinking. If the proportion of the peroxide crosslinking agent is greater than 5 parts, the resulting hose tends to have poor flexibility with high hardness.

To improve physical properties by increasing crosslinking efficiency, a co-crosslinking agent may be used together with the peroxide crosslinking agent. Examples of the co-crosslinking agent include a sulfur-containing compound, a multifunctional monomer, a maleimide compound and a quinone compound.

Examples of the sulfur-containing compound include sulfur, dipentamethylene thiuram tetrasulfide and mercaptobenzothiazole. Examples of the multifunctional monomer include divinylbenzene, ethylene glycol dimethacrylate, diallyl phthalate, trimethylolpropane trimethacrylate, triallyl cyanurate, triallyl isocyanurate (TAIC), triallyl trimellitate and triallyl tricyanurate. Examples of the maleimide compound include N,N'-m-phenylene bismaleimide and toluylene bismaleimide. Examples of the quinone compound include quinone dioxime and dibenzoyl-p-quinone dioxide. Among them, triallyl isocyanurate (TAIC) is preferably used because it forms cross-linked structure superior in acid resistance.

As the ethylene acrylic rubber of the component (B), those which are listed in the above-mentioned component (A) are exemplified.

The acrylic rubber of the component (B) is not specifically limited, however, examples thereof include one or more polymers formed by one or more monomers as follows. Examples of such monomers include acrylates such as methyl acrylate, ethyl acrylate, propyl acrylate, n-butyl acrylate, n-octyl acrylate, methoxymethyl acrylate, methoxyethyl acrylate and ethoxyethyl acrylate; vinyl esters such as vinyl acetate, vinyl propionate and vinyl butyrate; vinyl ketones such as methyl vinyl ketone and ethyl vinyl ketone; vinyl aromatic compounds such as styrene, α-styrene and vinyl toluene; conjugated dienes such as butadiene and isoprene; α-monoolefins such as ethylene, propylene and 1-butene; vinyl monomers having a hydroxyl group such as β-hydroxy ethyl acrylate and 4-hydroxy butyl acrylate; vinyl or vinylidene monomers having a nitrile group such as acrylonitrile, methacrylonitrile and β-cyanoethyl acrylate.

The vulcanizing agent for the at least one of acrylic rubber and ethylene acrylic rubber (component (B)) is not specifically limited, however, examples thereof include aliphatic polyamines such as hexamethylene diamine, hexamethylene diamine carbamate, N,N-dicinnamilidene-1,6-hexanediamine, diethylene triamine, triethylene tetramine and tetraethylene pentamine; partially-hydrogenated aliphatic polyamines such as partially-hydrogenated 1,3-bis(aminomethyl)cyclohexane, partially-hydrogenated 4,4'-methylenebis cyclohexyl amine, partially-hydrogenated 4,4'-methylenebis cyclohexylamine carbamate and partially-hydrogenated p,p-methylene dianiline; aromatic polyamines such as p,p-methylene dianiline, m-phenylene diamine and methaxylene amine; polyamines derived from these polyamines; organic carboxylic ammonium such as polyamide amine, ketimine, silamine, 2,2-bis{4-(4-aminophenoxy)phenyl}propane (BAPP), imidazole, 2-methyl imidazole, 2-ethyl-4-methyl imidazole, 2-phenyl imidazole, 2-undecyl imidazole, 2-heptadecyl imidazole, 1-methyl-2-ethyl imidazole, 1,2-dimethyl imidazole, 1-benzyl-2-ethyl imidazole, 2-phenyl-4-methyl imidazole, 1-cyanoethyl-2-methyl imidazole, 1-cyanoethyl-2-phenyl imidazole, 1-cyanoethyl-2-undecyl imidazole, 1-cyanoethyle-2-methyl-imidazole-trimellitate, 1-benzyl-2-methyl imidazole, ammonium benzoate and ammonium adipate. These may be used either alone or in combination.

The vulcanizing agent is preferably present in a proportion of 1 to 5 parts based on 100 parts of the component (B). If the proportion of the vulcanizing agent is smaller than 1 part, the resulting hose tends to have low strength because of insufficient crosslinking. If the proportion of the vulcanizing agent is greater than 5 parts, the resulting hose tends to have poor flexibility with high hardness.

In the present invention, the inner layer material excluding an acid receiver is used, which is a characteristic feature. This is because when an acid receiver such as metal oxides (i.e., zinc oxide and calcium oxide), there is the problem that the acid receiver is dissolved by an exhaust gas (concentrated acid fluid) so as to cause crack.

The inner layer material may appropriately include any of a vulcanizing agent, a lubricant such as a stearic acid, carbon black, an antioxidant, an inorganic filler, a colorant, a process aid and the like, as required, in addition to the specific alloy material (component (A)) and the at least one of acrylic rubber and ethylene acrylic rubber (component (B)).

As a material for forming the outer layer 2 (outer layer material), the following material is used. The material contains a non-peroxide-crosslinkable AEM and a non-halogen flame retardant as essential components wherein the non-halogen flame retardant is present at not less than 60 and less than 80 parts by weight based on 100 parts by weight of the non-peroxide-crosslinkable AEM.

The non-peroxide-crosslinkable AEM is not specifically limited as long as it can be vulcanized by a crosslinking agent other than a peroxide crosslinking agent. Examples thereof include aliphatic polyamines such as hexamethylene diamine, hexamethylene diamine carbamate, N,N-dicinnamilidene-1,6-hexanediamine, diethylene triamine, triethylene tetramine and tetraethylene pentamine; partially-hydrogenated aliphatic polyamines such as partially-hydrogenated 1,3-bis(aminomethyl)cyclohexane, partially-hydrogenated 4,4'-methylenebis cyclohexyl amine, partially-hydrogenated 4,4'-methylenebis cyclohexylamine carbamate and partially-hydrogenated p,p-methylene dianiline; aromatic polyamines such as p,p-methylene dianiline, m-phenylene diamine and methaxylene amine; polyamines derived from these polyamines; polyamide amine, ketimine, silamine and 2,2-bis{4-(4-aminophenoxy)phenyl} propane (BAPP). These may be used either alone or in combination. Among them, hexamethylene diamine carbamate is preferably used because of good heat resistance.

As the non-halogen flame retardant used together with the non-peroxide-crosslinkable AEM, those which do not react with crosslinking parts of the AEM are preferred. Examples thereof include metal hydroxides, surface-treated metal hydroxides, metal oxides, phosphorous flame retardants, nitric flame retardants, zinc borate, exfoliated graphite and ammonium phosphate, which may be used either alone or in combination. Among them, metal hydroxides and surface-treated metal hydroxides are preferably used in terms of heat resistance.

Examples of the metal hydroxides include aluminum hydroxide and calcium hydroxide, which may be used either alone or in combination. Further, when AEM is used for the heat-resistant rubber, aluminum hydroxide is preferably used, which exerts flame retardant effect (endothermic dehydration) at around 200° C. approximately same as a decomposition temperature of the AEM. Since magnesium hydroxide tends to react with crosslinking parts of the AEM, metal hydroxides other than the magnesium hydroxide are preferred.

Examples of the surface-treated metal hydroxides include the above-mentioned hydroxides surface-treated with a stearic acid, a silane coupling agent or the like.

The non-halogen flame retardant should be present in a proportion of not less than 60 and less than 80 parts based on 100 parts of the non-peroxide-crosslinkable AEM. If the proportion of the non-halogen flame retardant is less than 60 parts, the resulting hose is inferior in heat resistance and flame retardance. If the proportion of non-halogen flame retardant is not less than 80 parts, the resulting hose is inferior in any of physical properties at ordinary state, heat resistance or low-temperature performance.

Examples of the vulcanizing agent for vulcanizing the non-peroxide-crosslinkable AEM include non-peroxide vulcanizing agents such as an amine based agent, dithiocarbamate, ammonium benzoate, triazine, metallic salt and sulfur. The non-peroxide vulcanizing agent is preferably present in a proportion of 1 to 5 parts based on 100 parts of the AEM.

The outer layer material may appropriately include any of carbon black, a lubricant such as stearic acid, a process aid, a plasticizer, a crosslinking aid, an antioxidant, an inorganic filler, a colorant and the like, as required, in addition to the non-peroxide-crosslinkable AEM, the non-halogen flame retardant and the non-peroxide vulcanizing agent.

The heat-resistant air hose for a diesel engine of the present invention is produced, for example, as follows. The inner layer material is prepared by blending each ingredient for forming the inner layer, as mentioned above, and kneading the resulting mixture by means of a kneader. In the same manner, the outer layer material is prepared. After simultaneously extruding the materials for forming the inner layer and the outer layer by means of an extruder, the layers are vulcanized at specified conditions (for example, at 160 to 190° C. for 10 to 60 minutes). Thus, the intended heat-resistant air hose for a diesel engine having a two-layer structure can be obtained (see FIG. 1). Further, the interface between the inner layer and the outer layer can be strongly combined in vulcanization without an adhesive so that interlaminar integration can be realized.

The heat-resistant air hose for a diesel engine may be formed into a straight shape by a vacuum sizing method, or into a bellows shape by means of a corrugator.

The production method of the heat-resistant air hose for a diesel engine of the present invention is not limited to the aforesaid co-extrusion method for lamination of the respective layers. For example, the inner layer material is extruded by means of an extruder for formation of a single-layer hose structure, and then the outer layer material is extruded around the hose structure for the formation of the intended heat-resistant air hose for a diesel engine having the two-layer structure. Although the respective layers are generally bonded together without the use of an adhesive, an adhesive may be used as a bonding aid. Further, a reinforcing fiber (such as polyester, vinylon, aramid or nylon) may be interposed between the inner layer and the outer layer, as required.

In the heat-resistant air hose for a diesel engine of the present invention, the inner layer 1 generally has a thickness of 0.05 mm to 3 mm, preferably 0.1 mm to 2 mm and the outer layer 2 generally has a thickness of 0.05 mm to 3 mm, preferably 0.1 mm to 2 mm. The heat-resistant air hose for a diesel engine of the present invention generally has an inner diameter of 2 mm to 30 mm, preferably 5 mm to 25 mm.

The heat-resistant air hose for a diesel engine of the invention is not limited to the two-layer structure, as shown in FIG. 1, and, for example, the reinforcing layer may be formed between the inner layer 1 and the outer layer 2, as mentioned above.

Next, an explanation will be given to Examples in conjunction with Comparative Examples. However, the present invention is not limited to these Examples.

Prior to the description of the Examples and the Comparative Examples, materials for forming each inner layer were prepared as follows.

FKM-a (Containing Polyol)
Vinylidene Fluoride-Propylene hexafluoride-tetrafluoroethylene copolymer (DAI-EL G555 available from DAIKIN INDUSTRIES, LTD.)

FKM-b
A vinylidene fluoride-propylene hexafluoride-tetrafluoroethylene copolymer (DAI-EL G901 available from DAIKIN INDUSTRIES, LTD.)

AEM-a
An ethylene-methylacrylate copolymer (VAMAC-DP available from du Pont de Nemours and Company)

AEM-b
A terpolymer of an ethylene-methylacrylate copolymer and a vulcanization site monomer (VAMAC-G available from du Pont de Nemours and Company)

Stearic Acid
LUNAC S30 available from Kao Corporation

Acid Receiver
Magnesium oxide (KYOWA MAG #150 available from Kyowa Chemical Industry Co., Ltd.)

Carbon Black
MAF (Medium Abrasion Furnace) carbon black (SHOW BLACK MAF available from CABOT JAPAN K.K.)

Co-Crosslinking Agent
Triarylisocyanurate (TAIC-M60 available from Nippon Kasei Chemical Co., Ltd.)

Peroxide Crosslinking Agent
Di-t-butylperoxy-diisopropylbenzene (PEROXYMON F-40 available from NOF Corporation)

Crosslinking Aid
Di-o-tolylguanidine (NOCCELER DT available from OUCHI SHINKO CHEMICAL INDUSTRIAL CO., LTD.)

Vulcanizing Agent
Hexamethylenediamine carbamate (DIAK #1 available from du Pont de Nemours and Company)

Next, each inner layer material was prepared by using these materials.

(1) Preparation of Inner Layer Material
Each inner layer material A to F was prepared by blending each ingredient at a ratio shown in the following Table 1 and kneading the resulting mixture by means of a kneader.

The thus obtained inner layer material (unvulcanized composition) was press vulcanized at 160° C. for 45 minutes, and then formed into a vulcanized test piece having a shape and a size in accordance with a Japanese Industrial Standards (hereinafter referred to JIS) test method, described below (except for AEM, which was press vulcanized at 160° C. for 45 minutes, and was further vulcanized at 165° C. for 3 hours by hot-air oven). Each characteristic property was evaluated in accordance with the following criteria by using the thus obtained vulcanized test pieces.

Heat Resistance
Vulcanized test pieces each having a shape and a size in accordance with JIS K 6251 were produced and the thus obtained test pieces were used for evaluating heat resistance at 200° C. for 72 hours in accordance with JIS K 6257 Those having a tensile strength change (ΔTB) of not more than +40% and an absolute elongation of not less than 100% were evaluated as good (○)

Acid Resistance
Vulcanized test pieces each having a shape and a size in accordance with JIS K 6251 were produced and the thus obtained test pieces were used for evaluating acid resistance (organic acid and inorganic acid) under dipping conditions of 90° C. for 500 hours in accordance with JIS K 6258. As test liquid for organic acid, acetic acid or formic acid was used, while as test liquid for inorganic acid, hydrochloric acid, nitric acid or sulfuric acid was used, and then each test liquid was adjusted so as to have pH 1.5. Those causing no crack were evaluated as good (○), while those causing crack were evaluated as poor (x)

TABLE 1

| | (Parts by weight) Inner layer material | | | | | |
|---|---|---|---|---|---|---|
| | A | B | C | D | E | F |
| FKM-a (DAI-EL G555) | — | — | — | — | 100 | — |
| FKM-b (DAI-EL G901) | — | 80 | 70 | 60 | — | — |
| AEM-a (VAMAC-DP) | 100 | 20 | 30 | 40 | — | — |
| AEM-b (VAMAC-G) | — | — | — | — | — | 100 |
| Stearic acid | 1 | 1 | 1 | 1 | — | 1 |
| Acid receiver | — | — | — | — | 10 | — |
| Carbon black | 50 | 25 | 25 | 25 | 10 | 60 |
| Co-crosslinking agent (TAIC-M60) | 1.5 | 1.5 | 1.5 | 1.5 | — | — |
| Peroxide crosslinking agent (PEROXIMON F-40) | 3 | 3 | 3 | 3 | — | — |
| Crosslinking aid (NOCCELER DT) | — | — | — | — | — | 4 |
| Vulcanization agent (DIAK #1) | — | — | — | — | — | 1.5 |
| Heat resistance | ○ | ○ | ○ | ○ | ○ | ○ |
| ΔTB (%) | +15 | −30 | −37 | −41 | −3 | +15 |
| Absolute elongation (%) | 240 | 460 | 390 | 300 | 330 | 240 |
| Acid resistance | ○ | ○ | ○ | ○ | x | ○ |

As can be understood from the results shown in the Table 1, inner layer materials A to D and F were each good at heat resistance and acid resistance. However, inner layer material E was inferior in acid resistance because polyol vulcanized FKM was used and reacted with organic acid so as to cause abnormal swelling.

(2) Preparation of Outer Layer Material
Each outer layer material a to g was prepared by blending each ingredient at a ratio shown in the following Table 2 and kneading the resulting mixture by means of a kneader.

The thus obtained outer layer material (unvulcanized composition) was press vulcanized at 160° C. for 45 minutes, and was further vulcanized at 165° C. for 3 hours by hot-air oven, and then formed into a vulcanized test piece having a shape and a size in accordance with a JIS test method, described below. Each characteristic property was evaluated in accordance with the following criteria by using the thus obtained vulcanized test pieces.

Physical Properties at Ordinary State

Vulcanized test pieces each having a shape and a size in accordance with JIS K 6251 were produced and the thus obtained test pieces were used for evaluating tensile strength at break (TB) and elongation at break (EB) in accordance with JIS K 6251. Those having TB of not less than 8 MPa and EB of not less than 200% were evaluated as good (○). Those other than good (○) were evaluated as poor (x)

Heat Resistance

Vulcanized test pieces each having a shape and a size in accordance with JIS K 6251 were produced and the thus obtained test pieces were used for evaluating heat resistance at 200% for 72 hours in accordance with JIS K 6257. Those having a tensile strength change (ΔTB) of not more than +40% and not less than −10%, and an absolute elongation of not less than 100% were evaluated as good (○). Those other than good (○) were evaluated as poor (x).

Low-Temperature Properties

Vulcanized test pieces each having a shape and a size in accordance with JIS K 6404 were produced and the thus obtained test pieces were used for evaluating low-temperature properties. Those which were higher than −30° C. were evaluated as poor (x), while those which were not more than −30® C. were evaluated as good (○).

Flame Retardance

Figure 2:
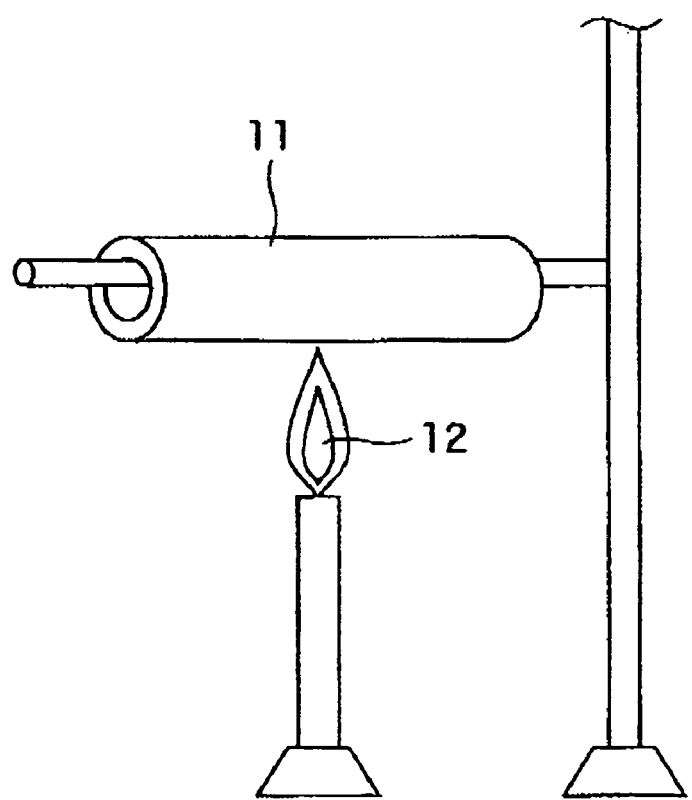
FIG. 2 is an explanatory diagram illustrating a method for evaluating flame retardance.

A hose 11 having an inner diameter of 13 mm, as shown in FIG. 2, was produced by molding each outer layer material (unvulcanized compound). A flame 12 was applied to a center of the hose 11, so that the hose was fired. After a lapse of 30 seconds, the flame 12 was removed. From that time, the time until the flame of the fired hose disappeared (fire extinction time) was measured. Those having the fire extinction time of not more than 5 seconds were evaluated as good (○). Those having the fire extinction time of over 5 seconds were evaluated as poor (x).

TABLE 2

| | Outer layer material (parts by weight) | | | | | | |
|---|---|---|---|---|---|---|---|
| | a | b | c | d | e | f | g |
| AEM *1 | — | — | — | — | — | 100 | 100 |
| AEM *2 | 100 | 100 | 100 | 100 | 100 | — | — |
| Stearic acid *3 | 1 | 1 | 1 | 1 | 1 | 1 | 1 |
| Carbon black *4 | 50 | 50 | 50 | 50 | 50 | 50 | 50 |
| Metal hydroxide *5 | 60 | 79 | — | 50 | 90 | 70 | 80 |
| Surface-treated metal hydroxide *6 | — | — | 70 | — | — | — | — |
| Antioxidant *7 | 1 | 1 | 1 | 1 | 1 | 1 | 1 |
| Process aid *8 | 4 | 4 | — | 4 | 4 | 4 | 4 |
| Plasticizer *9 | 10 | 10 | 10 | 10 | 10 | 10 | 10 |
| Co-crosslinking agent *10 | — | — | — | — | — | 1.5 | 1.5 |
| Peroxide crosslinking agent *11 | — | — | — | — | — | 3 | 3 |
| Crosslinking aid *12 | 4 | 4 | 4 | 4 | 4 | — | — |
| Vulcanization agent *13 | 1.5 | 1.5 | 1.5 | 1.5 | 1.5 | — | — |
| Physical properties at ordinary state | ○ | ○ | ○ | ○ | x | x | ○ |
| TB (MPa) | 10.2 | 9.3 | 10.8 | 11.0 | 5.0 | 2.9 | 9.0 |
| EB (%) | 360 | 300 | 350 | 360 | 230 | 600 | 300 |
| Heat resistance | ○ | ○ | ○ | ○ | x | x | x |
| ΔTB (%) | +2 | +8 | +3 | +2 | +64 | −15 | +10 |
| Absolute elongation (%) | 100 | 100 | 110 | 120 | 50 | 480 | 90 |
| Low temperature properties | ○ | ○ | ○ | ○ | x | — | x |

TABLE 2-continued

| | Outer layer material (parts by weight) | | | | | | |
|---|---|---|---|---|---|---|---|
| | a | b | c | d | e | f | g |
| (° C.) | −32 | −30 | −32 | −30 | −25 | — | −27 |
| Flame retardance | ○ | ○ | ○ | x | ○ | — | ○ |
| (Fire extinction time: sec) | 1 | 1 | 1 | 30< | 1 | | 1 |

*1: An ethylene-methylacrylate copolymer (VAMAC-DP available from du Pont de Nemours and Company)
*2: A terpolymer of an ethylene-methylacrylate copolymer and a vulcanization site monomer (VAMAC-G available from du Pont de Nemours and Company)
*3: LUNAC S30 available from Kao Corporation
*4: MAF (Medium Abrasion Furnace) carbon black (SHOW BLACK MAF available from CABOT JAPAN K. K.)
*5: Aluminum hydroxide (HIGILITE H42M available from Showa Denko K. K.)
*6: Aluminum hydroxide treated with stearic acid (HIGILITE H42S available from Showa Denko K. K.)
*7: NOCRAC DCD available from OUCHI SHINKO CHEMICAL INDUSTRIAL CO., LTD.
*8: RIKESTER SL-02 available from RIKEN VITAMIN CO., LTD.
*9: ADK CIZER RS-735 available from ADEKA CORPORATION
*10: Triallyl isocyanurate (TAIC-M60 available from Nippon Kasei Chemical Co., Ltd.)
*11: Di-t-butylperoxy-diisopropylbenzene (PEROXYMON F-40 available from NOF Corporation)
*12: Di-o-tolylguanidine (NOCCELER DT available from OUCHI SHINKO CHEMICAL INDUSTRIAL CO., LTD.)
*13: Hexamethylenediamine carbamate (DIAK #1 available from du Pont de Nemours and Company)

As can be understood from the results shown in the Table 2, outer layer materials a to c were each good at physical properties at ordinary state, heat resistance, low-temperature properties and flame retardance. Since the outer layer material d contained a low amount, i.e., 50 parts, of metal hydroxide, flame retardance was inferior. Since the outer layer material e contained a high amount, i.e., 90 parts, of metal hydroxide, physical properties at ordinary state, heat resistance and low-temperature properties were inferior. Since the outer layer material f employed peroxide-crosslinkable AEM, the peroxide crosslinking agent and metal hydroxide reacted with each other so as to cause crosslinking inhibition, resulting in inferior physical properties at ordinary state and heat resistance. Since the outer layer material g contained a high amount, i.e., 80 parts, of metal hydroxide, heat resistance and low-temperature properties were inferior.

EXAMPLES 1 TO 5 AND COMPARATIVE EXAMPLES 1 TO 6

Each hose was produced by employing each inner layer material and each outer layer material as shown in the following Tables 3 and 4. As mentioned above, each layer material was prepared, and was simultaneously extruded by means of an extruder, and then was vulcanized at specified conditions (160° C.×45 minutes). Thus, each two-layered hose (inner diameter: 5 mm) having an inner layer (thickness: 1.5 mm) and an outer layer (thickness: 1.5 mm) was obtained.

The properties of each hose produced in accordance with the Examples and the Comparative Examples were evaluated in the following manner. The results of the evaluations are shown in the following Tables 3 and 4.

Overall Evaluation

In accordance with each evaluation for the inner layer material and the outer layer material described above, overall evaluation of the hose was conducted. Those which had no poor (x) evaluation was evaluated as good (○), while those which other than good (○) was evaluated as poor (x).

TABLE 3

| | EXAMPLE | | | | |
|---|---|---|---|---|---|
| | 1 | 2 | 3 | 4 | 5 |
| Inner layer material | A | B | C | D | F |
| Outer layer material | b | a | b | c | c |
| Overall evaluation | ○ | ○ | ○ | ○ | ○ |

TABLE 4

| | COMPARATIVE EXAMPLE | | | | | |
|---|---|---|---|---|---|---|
| | 1 | 2 | 3 | 4 | 5 | 6 |
| Inner layer material | A | E | F | E | D | B |
| Outer layer material | d | b | f | e | e | g |
| Overall evaluation | x | x | x | x | x | x |

As can be understood from the results shown in the Tables 3 and 4, all Examples were good at overall evaluation. On the other hand, all Comparative Examples were poor at overall evaluation, because any of their evaluation was poor.

What is claimed is:

1. A heat-resistant air hose for a diesel engine comprising a tubular inner layer and an outer layer formed on an outer peripheral surface of the inner layer, wherein a material for forming the inner layer comprises peroxide-crosslinkable ethylene acrylic rubber and peroxide crosslinking agent and excludes an acid receiver, and a material for forming the outer layer comprises a non-peroxide-crosslinkable ethylene acrylic rubber, a non-peroxide-crosslinking agent and a non-halogen flame retardant, wherein the non-halogen flame retardant is present at not less than 60 and less than 80 parts by weight based on 100 parts by weight of the non-peroxide-crosslinkable ethylene acrylic rubber, and wherein the non-halogen flame retardant is surface-treated metal hydroxide being formed by surface treating aluminium hydroxide.

2. A heat-resistant air hose for a diesel engine as set forth in claim 1, wherein the surface-treated metal hydroxide in the material for forming the outer layer is a metal hydroxide surface-treated with a stearic acid or a silane coupling agent.

3. A heat-resistant air hose for a diesel engine as set forth in claim 1, wherein a non-peroxide-crosslinking agent for crosslinking the ethylene acrylic rubber for forming the outer layer is hexamethylene diamine carbamate.

4. A heat-resistant air hose for a diesel engine as set forth in claim 1, wherein the air hose is at least one selected from the group consisting of a diesel particulate filter (DPF) sensor hose; a vacuum brake hose for a diesel engine; an air hose for a diesel engine; and a turbo (supercharger) air hose for a diesel engine.

5. A heat-resistant air hose for a diesel engine as set forth in claim 1, wherein a non-peroxide-crosslinking agent for forming the outer layer is present in a proportion of 1 to 5 parts by weight based on 100 parts by weight of the non-peroxide-crosslinkable ethylene acrylic rubber.

* * * * *